Aug. 15, 1933.  L. WOLF  1,922,066
FLOWERPOT HANDLE
Filed March 19, 1931
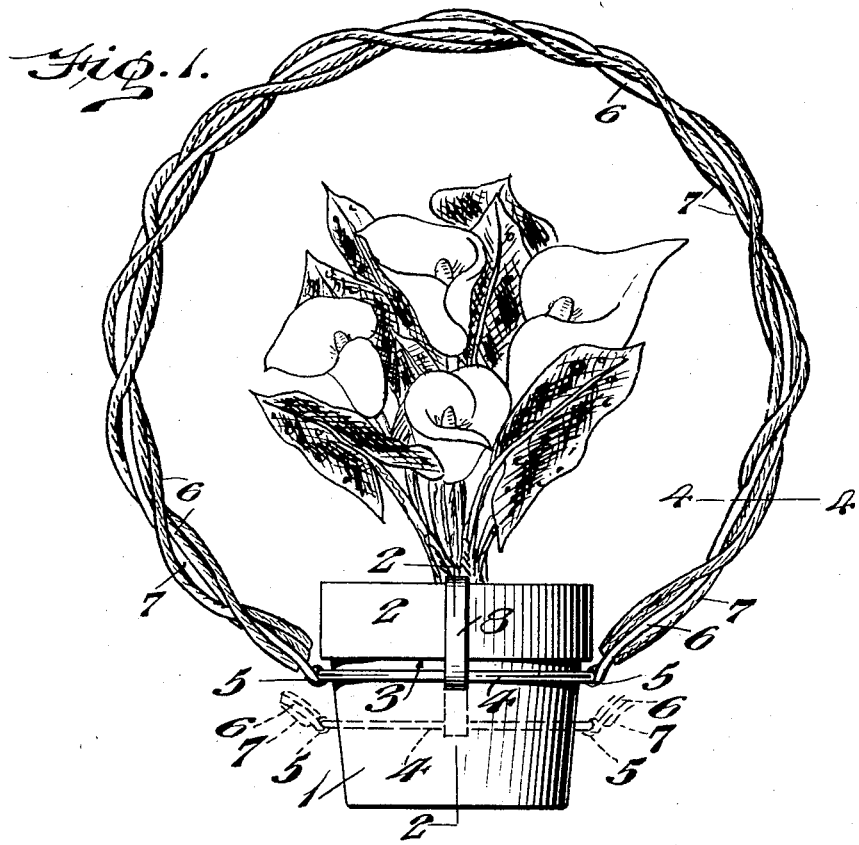
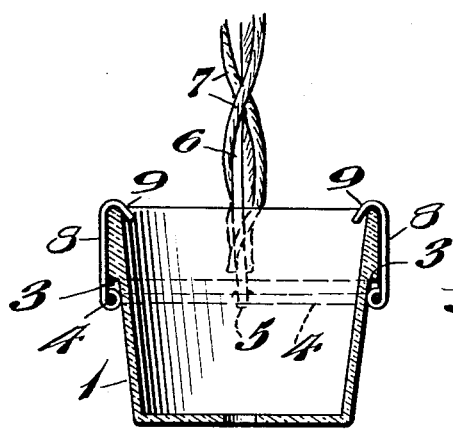
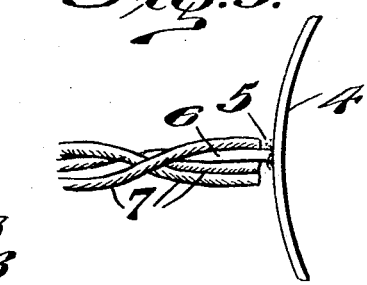
INVENTOR.
LOUIS WOLF
BY Louis Necho
ATTORNEY.

Patented Aug. 15, 1933

1,922,066

UNITED STATES PATENT OFFICE 1,922,066

FLOWERPOT HANDLE

Louis Wolf, Philadelphia, Pa.

Application March 19, 1931. Serial No. 523,771

1 Claim. (Cl. 215—100)

My invention relates to a new and useful flower pot handle which is specially adapted for use in carrying a flower pot in a safe and convenient Handles for flower pots heretofore made and used have consisted of a handle of an oval shape which was provided with a bottom pan adapted to receive a flower pot, or of a resilient handle having hooks adapted to engage the usual flange at the upper end of a flower pot or some similar construction all of which I have found to be defective and inefficient in some respect or another, such as, in failing to afford a positive grip, or in being unadjustable for various sizes of flower pots and in many other respects.

It is therefore the object of my invention to produce a handle which in addition to affording a positive grip to insure absolute safety of the flower pot during transportation, is also adjustable to a wide range of flower pots, thereby minimizing the variety of sizes in which it would otherwise be necessary to manufacture and thus materially reducing the cost of manufacture. A further object of my invention is to produce a handle which in addition to the foregoing advantages is also artistic in its appearance, durable in its nature and inexpensive to produce.

To the above ends my invention consists of a handle comprising a bottom ring adapted to engage the lower downwardly tapering portion of a flower pot, flat relatively pliant metal straps carried by said ring and adapted to extend upwardly along the outer wall of the flower pot, the upper ends of said straps being adapted to be bent or deflected downwardly to form a hook which will engage the upper rim of said flower pot. My invention further consists of various other novel features of advantage and construction all as hereinafter described and claimed in the accompanying drawing, in which:—

Fig. 1 represents a view in side elevation of a flower pot handle embodying my invention shown in actual use.

Fig. 2 represents a vertical sectional view on line 2—2 of Fig. 1.

Fig. 3 represents a fragmentary plan view showing details of construction.

Fig. 4 represents a section on line 4—4 of Fig. 1.

Referring to the drawing in which like reference characters indicate like parts, 1 designates the lower tapering portion of a conventional flower pot which is provided with the upper portion 2 of a slightly larger diameter so as to form an annular shoulder 3. 4 designates a ring to which is welded at 5 the bottom free ends of the oval shaped wire handle 6. The wire handle 6 is inter-twined with wicker strands 7 which serve to cover the wire 6. The wire 6 and the wicker strands 7 together with the ring 4 are suitably painted in one or more colors for artistic effect. To the ring 4 are welded or otherwise secured the flat metal straps 8 which are made of a pliant sheet metal so that their upper ends may be deflected to form hooks 9 engaging the upper rim of the flower pot, as will be understood from Fig. 2.

Due to the tapering character of the bottom portion 1 of the flower pot, I am able to use the standard size ring for a relatively large range of sizes of flower pots since the ring 4 will, if applied to a small flower pot engage the shoulder 3, and will, if applied to a larger flower pot, engage, by a wedging action, any point along the bottom portion 1 as shown in dotted lines in Fig. 1. The metal straps 8 are made relatively long so that they may be long enough to engage the upper rim of the flower pot when deflected to form the hooks 9. When the metal straps are deflected to form the hooks 9 to engage the upper rim of the flower pot, positive engagement of the flower pot between the hooks 9 and the ring 4 results, so that even if the flower pot is laid or set down, the ring 4 is prevented from sliding downwardly, thereby preventing the handle from damaging the plant in the pot and also eliminating all risk of dropping and breaking the flower pot.

It will thus be seen that my novel flower pot handle affords absolute security for the flower pot carried thereby and that it is also adjustable for and adapted for effective application to a wide range of variety of sizes of flower pots. It will also be seen that my novel flower pot handle in addition to being highly ornamental is also extremely inexpensive to produce and is very simple in its use and application.

Having thus described my invention what I claim as new and desire to secure by Letters Patent, is:—

A flower pot holder comprising a bottom integral ring adapted to engage the lower tapered portion of a conventional flower pot, a handle member having its lower ends secured to said ring, and straps carried by said ring and of a length substantially equal to the height of said flower pot, said straps being pliant and form-retaining when bent, whereby the portions of said straps extending beyond the upper rim of said flower pot may be deflected to form gripping members to engage the upper rim of said pot to prevent disengagement of said pot from said ring.

LOUIS WOLF.